(12) United States Patent
Gauvin

(10) Patent No.: US 8,301,432 B1
(45) Date of Patent: Oct. 30, 2012

(54) SYSTEMS AND METHODS FOR DETERMINING A POWER CYCLE OF A POWER SOURCE OF A MOBILE DEVICE

(75) Inventor: William J. Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 425 days.

(21) Appl. No.: 12/612,838

(22) Filed: Nov. 5, 2009

(51) Int. Cl.
    *G06F 9/44* (2006.01)
    *G06F 13/10* (2006.01)
    *G06F 13/12* (2006.01)

(52) U.S. Cl. ............. 703/21; 703/23; 713/340; 455/423

(58) Field of Classification Search ...................... 703/21
See application file for complete search history.

(56) References Cited

U.S. PATENT DOCUMENTS

| | | | | |
|---|---|---|---|---|
| 6,167,524 | A * | 12/2000 | Goodnow et al. ............. | 713/300 |
| 6,754,470 | B2 * | 6/2004 | Hendrickson et al. ..... | 455/67.11 |
| 7,457,647 | B2 * | 11/2008 | Owens et al. ................. | 455/574 |
| 7,570,975 | B2 * | 8/2009 | Oprescu-Surcobe et al. | 455/574 |
| 7,751,807 | B2 * | 7/2010 | Lin et al. ....................... | 455/418 |
| 8,060,074 | B2 * | 11/2011 | Danford et al. .............. | 455/419 |
| 2006/0271618 | A1 * | 11/2006 | Kokubo et al. ............... | 709/202 |
| 2006/0279256 | A1 * | 12/2006 | Bletsas ......................... | 320/128 |
| 2009/0177567 | A1 * | 7/2009 | McKerlich et al. ............. | 705/35 |

OTHER PUBLICATIONS

Cignetti et al, "Energy Estimation Tools for the Palm", Proceedings of the 3rd ACM International Workshop on Modeling, Analysis and Simulation of Wireless and Mobile Systems, 2000.*
Krintz et al, "Application-level Prediction of Battery Dissipation", Proceedings of the 2004 International Symposium on Low Power Electronics and Design, 2004.*
Handy et al, "Simulation of Mobile Wireless Networks with Accurate Modeling of Non-Linear Battery Effects", Proceedings of Applied Simulation and Modeling, 2003.*
Flinn et al, "Managing Battery Lifetime with Energy-Aware Adaptation", ACM Transactions on Computer Systems, vol. 22, No. 2, May 2004, pp. 137-179.*
Kamat et al, "Energy Management Architecture for Multimedia Applications in Battery Powered Devices", IEEE Transactions on Consumer Electronics, vol. 55, Issue 2, May 2009.*
Read et al, "Developing Mobile Wireless Applications", IEEE Internet Computing, Jan.-Feb. 2003.*
Panigrahi, Debashis, et al., *Battery Life Estimation of Mobile Embedded Systems*, Dept. of Electrical and Computer Engg., University of California, San Diego, CA (7 pgs.), Fourteenth International Conference on VLSI Design, 2001.

* cited by examiner

*Primary Examiner* — Mary C Jacob
(74) *Attorney, Agent, or Firm* — Holland & Hart LLP

(57) ABSTRACT

A computer-implemented method for determining a power cycle of a power source of a mobile device is described. An execution of one or more components on the mobile device is simulated. An amount of power drawn by the one or more components from the power source is estimated during the simulated execution of each of the one or more components. The estimated amounts of power drawn from the power source by each of the one or more components are aggregated to obtain a total estimate of power drawn from the power source. The power cycle of the power source is determined according to the total estimate of power drawn from the power source by each of the one or more components.

20 Claims, 8 Drawing Sheets

SYSTEMS AND METHODS FOR DETERMINING A POWER CYCLE OF A POWER SOURCE OF A MOBILE DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve the functionality of mobile computing devices. Mobile devices may increase the amount of tasks a user may perform because the user may take a mobile device to remote locations to perform computing tasks.

Mobile devices may include a power supply, such as a battery. The available power that the battery provides the mobile device may have a finite power cycle (i.e., lifetime). Once the lifetime of the battery has expired, the user may replace the battery or recharge the battery. Because the user may be in a remote location, it may be difficult or impossible for the user to recharge the battery. In addition, the user may not be aware of how long the battery will be able to provide power to the mobile device. As a result, benefits may be realized by providing systems and methods for determining a power cycle of a power source of a mobile device.

SUMMARY

According to at least one embodiment, a computer-implemented method for determining a power cycle of a power source of a mobile device is described. An execution of one or more components on the mobile device is simulated. An amount of power drawn by the one or more components from the power source is estimated during the simulated execution of each of the one or more components. The estimated amounts of power drawn from the power source by each of the one or more components are aggregated to obtain a total estimate of power drawn from the power source. The power cycle of the power source is determined according to the total estimate of power drawn from the power source by each of the one or more components.

In one embodiment, a report including power source kitting information and power source recharging information may be generated. In one configuration, the one or more components include one or more applications executing on one or more central processing units (CPU), one or more transmitters, or one or more receivers. In one example, the one or more applications may be anti-virus applications. The simulated execution of the one or more applications may include a simulated scan for viruses on the one or more CPUs using one or more transmitters or receivers. The simulated execution of the one or more applications may also include a simulated poll for software updates to the one or more applications.

In one configuration, a classification of each of the one or more applications may be determined. A policy associated with an application may be modified in order to alter the simulated execution of the application. In one embodiment, the modified policy alters the simulated execution of the application to pull subsets of software updates based on a priority classification of the updates. In one example, a modified power cycle of the power source may be determined according to the altered simulated execution of the application. In one embodiment, a rate capacity effect on the power source caused by each simulated execution of the one or more applications may be determined.

A computing device configured to determine a power cycle of a power source of a mobile device is also described. The device may include a processor and memory in electronic communication with the processor. The computing device may also include an emulator module configured to simulate an execution of one or more components on the mobile device, and estimate an amount of power drawn by the one or more components from the power source during the simulated execution of each of the one or more components. The emulator module may also be configured to aggregate the estimated amounts of power drawn from the power source by each of the one or more components to obtain a total estimate of power drawn from the power source, and determine the power cycle of the power source according to the total estimate of power drawn from the power source by each of the one or more components.

A computing device configured to determine a power cycle of a power source of a mobile device is also described. The device may include a processor and memory in electronic communication with the processor. The computing device may also include an emulator module configured to simulate an execution of one or more transmitters and receivers. The emulator module may be further configured to estimate an amount of power drawn by the one or more transmitters and receivers from the power source during the simulated execution of each of the one or more transmitters and receiver. The emulator module may also be configured to aggregate the estimated amounts of power drawn from the power source by each of the one or more transmitters and receivers to obtain a total estimate of power drawn from the power source, and determine the power cycle of the power source according to the total estimate of power drawn from the power source by each of the one or more transmitters and receivers A computer-program product for determining a power cycle of a power source of a mobile device is also described. The computer-program product may include a computer-readable medium having instructions thereon. The instructions may include code programmed to simulate an execution of one or more components on the mobile device, and code programmed to estimate an amount of power drawn by the one or more components from the power source during the simulated execution of each of the one or more components. The instructions may also include code programmed to aggregate the estimated amounts of power drawn from the power source by each of the one or more components to obtain a total estimate of power drawn from the power source, and code programmed to determine the power cycle of the power source according to the total estimate of power drawn from the power source by each of the one or more components.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
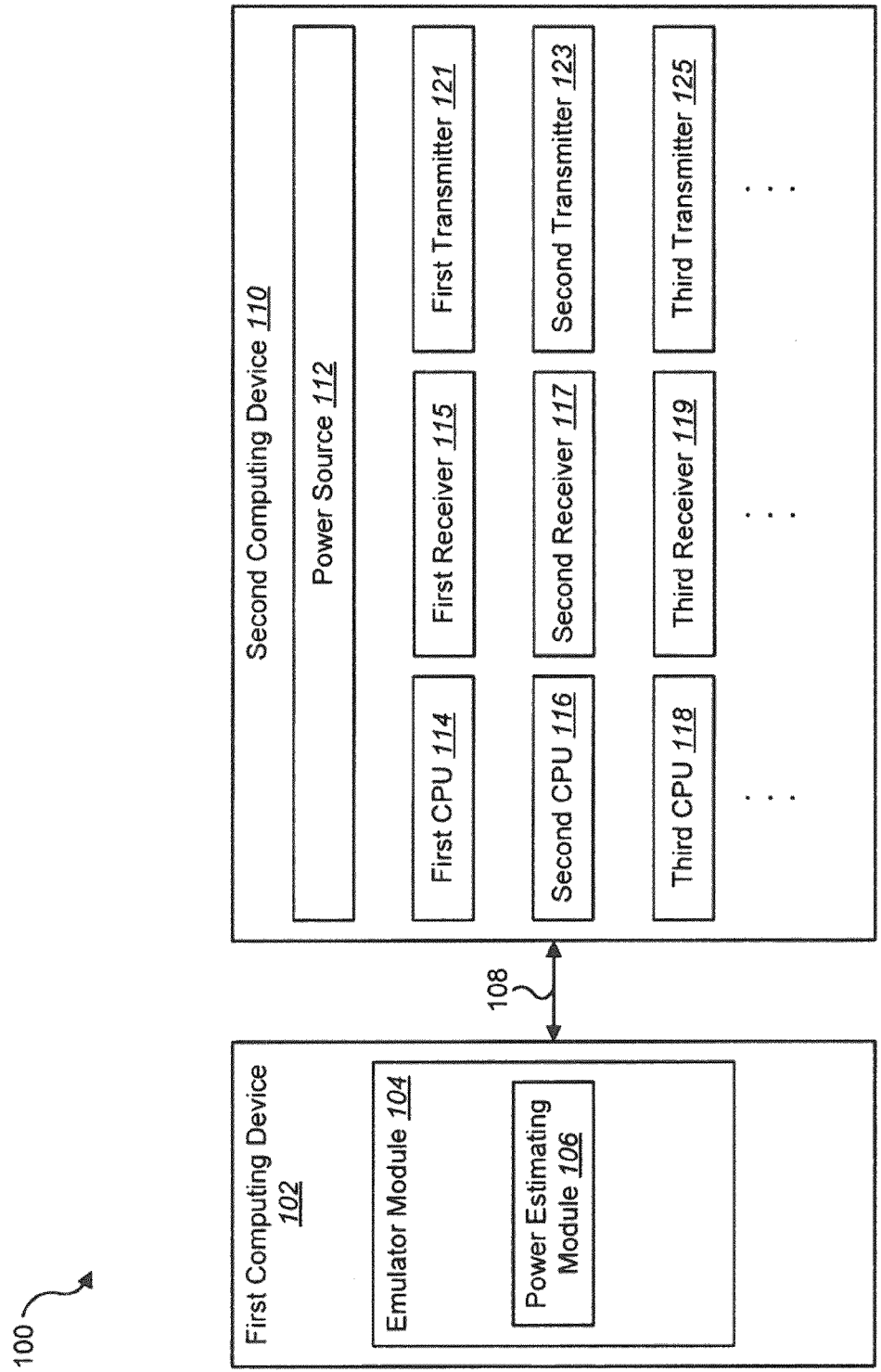
FIG. 1 is a block diagram illustrating one embodiment of a first computing device communicating with a second computing device.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The use of mobile devices has increased significantly over the past several years. Examples of these mobile devices may include mobile communication devices that may transmit and receive packets of information across a network. One example of a mobile device may include a secure mobile environment portable electronic device (SMEPED). These mobile devices may transmit and receive packets of information across a secure communications line or an unsecured communications line. In one example, a mobile device may include multiple central processing units (CPUs). Each one of these multiple CPUs in a mobile device may execute a separate instance of an operating system. In addition, one or more applications may run in each operating system instance. In one configuration, each application may be assigned a certain classification. For example, one application may be classified as a secure application and another application may be classified as an unsecured application. In one embodiment, each of the one or more applications may be executed according to a policy. The policy may specify how often the application is executed, the length of time the application is active, and the like. The policy associated with each application may be based on the classification of the application.

In one embodiment, the power supply of a mobile device may have a finite lifetime (or power) cycle. For example, a battery in a mobile device has a certain amount of power to provide before the battery needs to replaced or recharged. Multiple CPUs on a mobile device may cause a significant power drain on the power supply (i.e., a battery) of a mobile device. In addition, multiple transmitters and/or receivers within a mobile device may also cause a significant power drain on the power supply. For example, receivers may draw a large amount of power when powering up. In one embodiment, the various applications of each CPU, and each transmitter and receiver on the mobile device may execute various processes at different times and with different configurations, which may cause a significant power drain to the power supply of the device. As an example, a first CPU, transmitter, and/or receiver on a device may be dedicated for unsecured communications while a second CPU, transmitter, and/or on the device may be dedicated for secured communications. The first CPU, transmitter, and/or receiver and the second CPU, transmitter, and/or receiver may each run a separate copy of an anti-virus application. Each anti-virus application may run a completely different set of configurations that are specific for the environment of the application. For example, an anti-virus application running on the first CPU, may run configurations according to a policy used for unsecured communications. Similarly, an anti-virus application running on the second CPU may run configurations according to a policy used for secured communication.

In one embodiment, policies may specify when an anti-virus application should scan a system for viruses. In addition, policies may specify when an anti-virus application should poll for updates to the application. For example, an anti-virus application may poll a network for live updates at a frequency specified by the policy. Scanning a system and polling for updates may cause a large power drain on a battery. When the power supply (or battery) is depleted of power to provide the mobile device, the device may cease to function properly. When the available power is depleted, the user of the mobile device may not be in a location to adequately recharge the power supply and/or may not have a replacement power supply to replace the depleted battery. Because a mobile device may include multiple CPUs, transmitters, and/or receivers (and multiple applications with different configurations), it may be difficult for a user to correctly estimate when the power of a battery will be depleted (i.e., the lifetime of the battery). As a result, the present systems and methods determine the power cycle, lifetime, etc. of a power supply based on specific policies of applications that will be executed by the device. In addition, the present systems and methods may provide a deployment plan that includes replacement power supply requirements and recharging times for the power supply based on the determined power cycle of the power supply. Further, the present systems and methods may measure, analyze, and emulate the power consumption of each packet of information sent/received by the multiple transmitters/receivers. In particular, the power consumption of each receiver during a power-up state may also be measured, analyzed, and emulated.

In one embodiment, a current discharge profile of a power source may be analyzed in order to estimate the power cycle of the power source. If a current of magnitude greater than the rated current of the power source is discharged, the efficiency of the power source may decrease. In other words, the battery lifetime may decrease. This effect may be known as the rate capacity effect. In addition, if a power source is discharged for short time intervals, followed by idle periods, the energy delivered by the power source may increase. During the idle periods, the power source may partially recover the capacity lost in previous discharges. This effect may be known as the recovery effect.

In one example, the simulation of processing incoming packets to a mobile device may be executed. Examples of these packets may be updates to an application or packets associated with performing a virus scan of a CPU. The current discharge of the power source used to process these simulated packets may be determined. The specific energy delivered by the power source and the power cycle of the power source may be estimated based on the current discharge profile.

In one configuration, this simulation of packet processing may be repeated for any given discharge demand until the power source is discharged. The delivered specific energy and the lifetime of the power source may then be estimated. The estimation of the power source's lifetime may be obtained by evaluating both the rate capacity effect and the recovery effect simultaneously. If only the rate capacity effect is considered, the delivered energy and power cycle may not be accurate if idle periods of discharge exist. By considering both the effects simultaneously, the estimation of the power source's lifetime based on each CPU running on a mobile device may be an accurate estimation. The present systems and methods may then aggregate the various power cycle estimates from each CPU and obtain a total lifetime estimate of the power source on the mobile device.

FIG. 1 is a block diagram 100 illustrating one embodiment of a first computing device 102 communicating with a second computing device 110 across a connection 108. In one configuration, the first computing device 102 may emulate the behavior of the second computing device 110 through an emulator module 104. Examples of the first and second computing devices 102, 110 may include, without limitation, a mobile communications device, a secured mobile environment portable electronic device (SMEPED), a laptop, a personal digital assistant (PDA), and the like.

In one embodiment, the second computing device 110 may be a mobile device that a user may take out into the field to an offsite location in order to perform various functions. The second computing device 110 may include a power source 112, such as a battery. In addition, the second computing device 110 may include a plurality of CPUs 114, 116, 118. Further, the second computing device 110 may also include a plurality of receivers 115, 117, 119 and a plurality of transmitters 121, 123, 125. Although only three CPUs, transmitters, and receivers are illustrated within the second computing device 110, it is to be understood that more or less than three CPUs, transmitters, and receivers may be running on the second computing device 110.

The emulator module 104 included within the first computing device 102 may analyze various features and behaviors of each CPU 114, 116, 118, receiver 115, 117, 119 and transmitter 121, 123, 125 operating on the second computing device 110. The emulator module 104 may include a power estimating module 106 that may estimate the power cycle of the power source 112 according to the behavior of the multiple CPUs 114, 116, 118, receivers 115, 117, 119, and transmitters 121, 123, 125. As a result, the emulator module 104 allows the first computing device 102 to emulate the second computing device 110. In particular, the power estimating module 106 may determine the approximate lifetime of the power source 112. As a result, the first computing device 102 may provide an estimate time as to when the available power of the power source 112 may be depleted before a user takes the second computing device 110 to a remote location.

In another embodiment, the emulator module 104 may be located within the second computing device 110. As a result, the emulator module 104 may analyze and estimate the power cycle of the power source 112 without the need of the first computing device 102.

Figure 2:
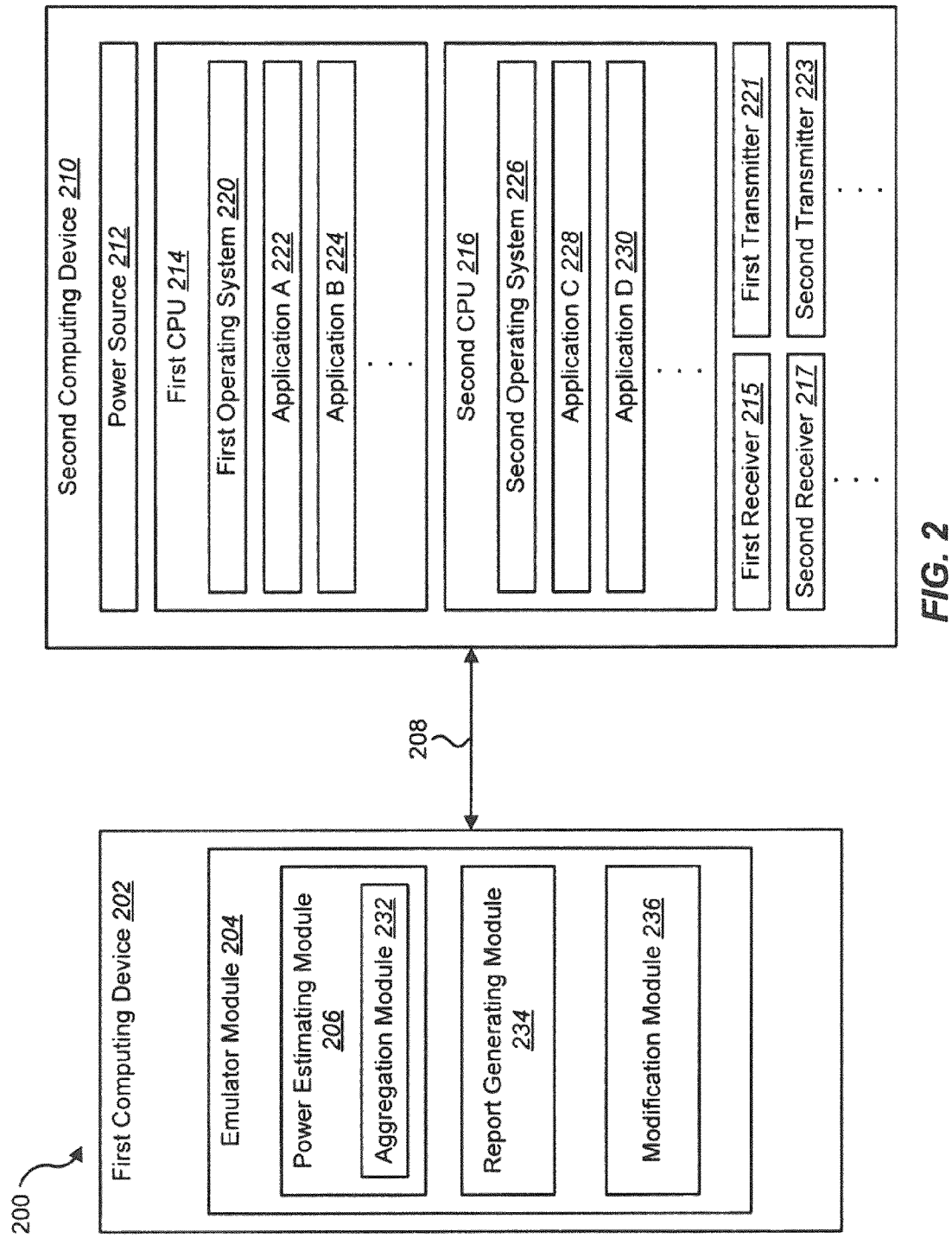
FIG. 2 is a block diagram illustrating another embodiment of a first computing device communicating with a second computing device such that the first computing device may emulate certain behaviors and characteristics of the second computing device.

FIG. 2 is a block diagram 200 illustrating another embodiment of a first computing device 202 communicating with a second computing device 210 across a connection 208 such that the first computing device 202 may emulate certain behaviors and characteristics of the second computing device 210. The second computing device 210 may include a power source 212 which may supply power to one or more CPUs 214, 216, receivers 215, 217, and transmitters 221, 223 operating on the second computing device 210.

In one configuration, each CPU 214, 216 on the second computing device 210 may include a separate instance of an operating system 220, 226. Each operating system 220, 226 may execute one or more applications. For example, a first operating system 220 may execute or allow the execution of an application A 222 and an application B 224. While only two applications 222, 224 are illustrated as being executed on the first CPU 214, it is to be understood that more or less than two applications may run on the first CPU 214. Similarly, a second operating system 226 within the second CPU 216, may execute or allow the execution of an application C 228 and an application D 230.

Each application 222, 224, 228, 230 may be executed according to a specific policy or configuration. For example, the first CPU 214 may be designated to process secure or classified information, and the second CPU 216 may be designated to process unsecured or unclassified information. In one embodiment, applications A, 222, B 224, C 228, and D 230 may be anti-virus applications. Because application A 222 and application B 224 run on the first CPU 214 (which is designated to process secure information), the policies (or configurations) of application A 222 and application B 224 may indicate that application A 222 and application B 224 poll a network for anti-virus updates at a high frequency (on a regular basis). In contrast, the policies of applications C and D 228, 230 may indicate that these applications 228, 230 poll for updates less often because they are running on the second CPU 216, which is designated to process unsecured information. In one embodiment, the applications may also poll a network for partial anti-virus updates. For example, the applications may poll for "priority 1 signature" updates.

In addition, application A 222 and application B 224 may be configured according to a policy to scan the first CPU 214 for viruses on a regular basis while application C 228 and application D 230 may scan the second CPU 216 for viruses less frequently because the second CPU 216 processes unsecured or unclassified information. Functions executed by these applications 222, 224, 228, 230 may drain a certain amount of power from the power source 212. Because each application may perform these functions at different times and with different regularity, an emulator module 204 may determine an approximate power cycle of the power source 212.

In one embodiment, the first computing device 202 may include the emulator module 204. In an additional embodiment, the second computing device 210 may include the emulator module 204. The module 204 may analyze the behavior of each CPU 214, 216, receiver 215, 217, and transmitter 221, 223 running on the second computing device 210. Based on the analysis, the first computing device 202 may emulate or provide information to a user regarding the power cycle of the power source 212 on the second computing device 210. In one example, the emulator module 204 may include a power estimating module 206 that may estimate the approximate time period before the power source 212 is depleted of available power based on how often the applications 222, 224, 228, 230 are executed. The frequency of execution of an application may be based on the policy or configurations associated with the application.

In one example, the power estimating module 206 may include an aggregation module 232. The aggregation module 232 may combine the analysis results for each CPU, transmitter, and receiver executing on the second computing device 210 and the potential power drain each CPU, transmitter, and receiver has on the power source 212. In other words, the emulator module 204 may determine the power draw on the power source 212 caused by the first CPU 214, the first receiver 215, and the first transmitter 221. The emulator module 204 may also determine the power draw on the power source 212 caused by the second CPU 216, the second receiver 217, and the second transmitter 223. The aggregation module 232 may then aggregate these results together to determine the total power draw on the power source 212 caused by each CPU running on the second computing device 210. The power estimating module 206 may then estimate the total approximate power cycle of the power source 212 on the second computing device 210.

A report generating module 234 may then generate a report that includes information regarding the total power cycle of the power source 212. The report generating module 234 may also provide additional information to a user regarding approximate times to recharge the power source 212 and/or the number of replacement power sources that may be required to replace the power source 212. In addition, the emulator module 204 may include a modification module 236. The modification module 236 may modify a policy (or configuration) associated with each application 222, 224, 228, 230 such that each application may execute or run at modified times. The modification of the policies of one or more applications may subsequently alter the original power draw estimate determined above. In other words, a user may analyze the report provided by the report generating module 234, and modify the policy associated with one or more applications in order to increase or decrease the power cycle of the power source 212 indicated by the report generated by the module 234.

Figure 3:
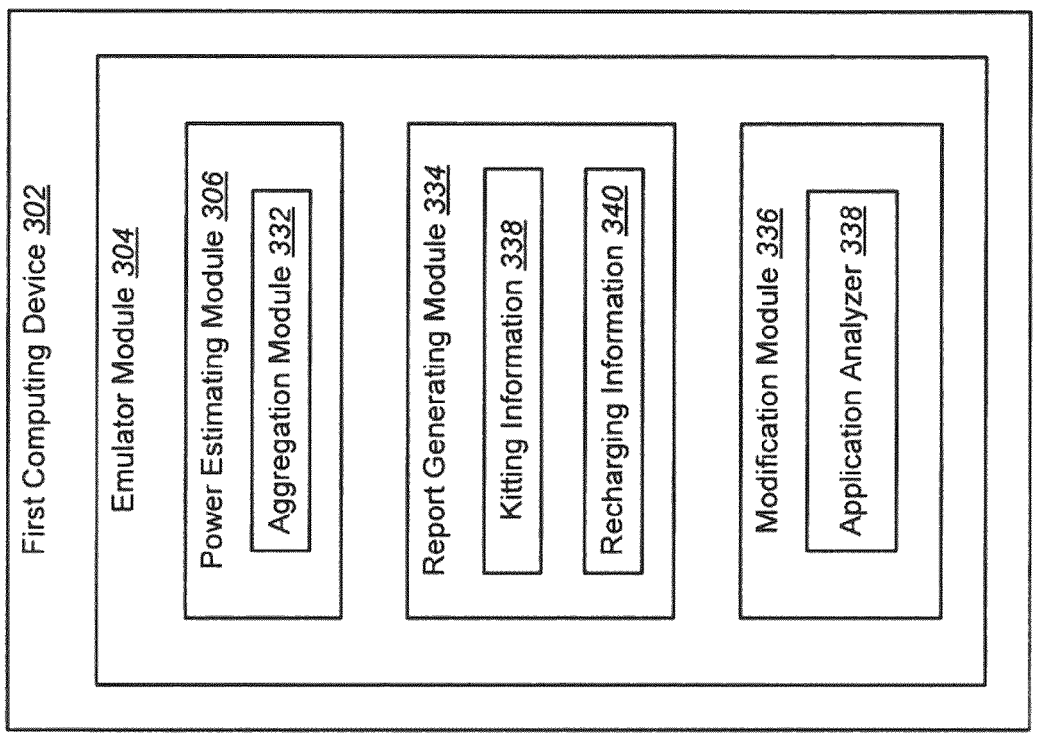
FIG. 3 is a block diagram illustrating one embodiment of a first computing device that may emulate the behaviors of a second computing device.

FIG. 3 is a block diagram illustrating one embodiment of a first computing device 302 that may emulate the behaviors of a second computing device 110 (not shown) in order to determine the approximate power cycle of a power source on the second computing device. As previously explained, the first computing device 302 may include an emulating module 304. The emulating module 304 may include a power estimating module 306, a report generating module 334, and a modification module 336.

In one embodiment, the power estimating module 306 may include an aggregation module 332. As previously explained, the power draw on a power source within the second computing device may be approximated or determined for each CPU, receiver, and transmitter running the second computing device. The aggregation module 332 may then aggregate these results together and the power estimating module 306 may determine a total approximate power cycle of the power source.

The report generating module 334 may then generate a report that a user may analyze. The report may indicate the total approximate power cycle of the power source of the second computing device. The report may also include kitting information 338 and recharging information 340. The kitting information 338 may include information that specifies the quantity (if any) of replacement power sources that a user may take when using the second computing device in a remote location where recharging capabilities of the original power source may not be available. The recharging information 340 may include information relating to the approximate time or length of time before the power source of the second computing device is required to be recharged.

In addition, the emulator module 304 may include a modification module 336. The modification module 336 may include an application analyzer 338. The analyzer 338 may analyze applications running on each CPU within the second computing device. The analyzer 338 may determine whether an application is a classified application or an unclassified application. In other words, the analyzer 338 may determine if an application is running on a CPU designated for processing secured/classified information or if the application is running on a CPU designated for processing unsecured/unclassified information. If the analyzer 338 determines that an application is an unclassified application, the modification module 336 may allow a user to modify the policy (or configurations) associated with the application. For example, an unclassified application may be configured to infrequently scan a CPU for viruses, because the CPU is not processing sensitive information. As a result, an infrequent scan of the CPU for viruses may be sufficient. In contrast, a classified application running on a CPU designated to process secured/sensitive information may scan the CPU much more frequently for viruses.

In one embodiment, the unclassified application may also infrequently poll a network for updates to the application while the classified application may frequently poll the network for updates. For example, if the unclassified and classified applications are anti-virus software, an infrequent poll for updates to the software may be sufficient for the unclassified application because the application is running on a CPU that processes unsecured/non-sensitive information. In contrast, the classified application may poll for updates much more frequently because the CPU on which the classified application is running is processing sensitive information.

In one embodiment, the modification module 336 may modify the policy of an unclassified application so that the application scans for viruses at a reduced or increased frequency rate. Similarly, the configurations of the unclassified application may be modified so that the application polls a network for updates at a reduced or increased frequency rate. In one embodiment, the modification module 336 may also allow update policies to be defined to pull specific updates (e.g., priority 1 (high)) for unclassified applications. The update policies may also be defined to pull all updates for the classified applications. After an application is modified by the modification module 336, the emulator module 308 may determine a new total of estimated power draw on the power source of the second computing device based on the modifications to the unclassified application.

Figure 4:
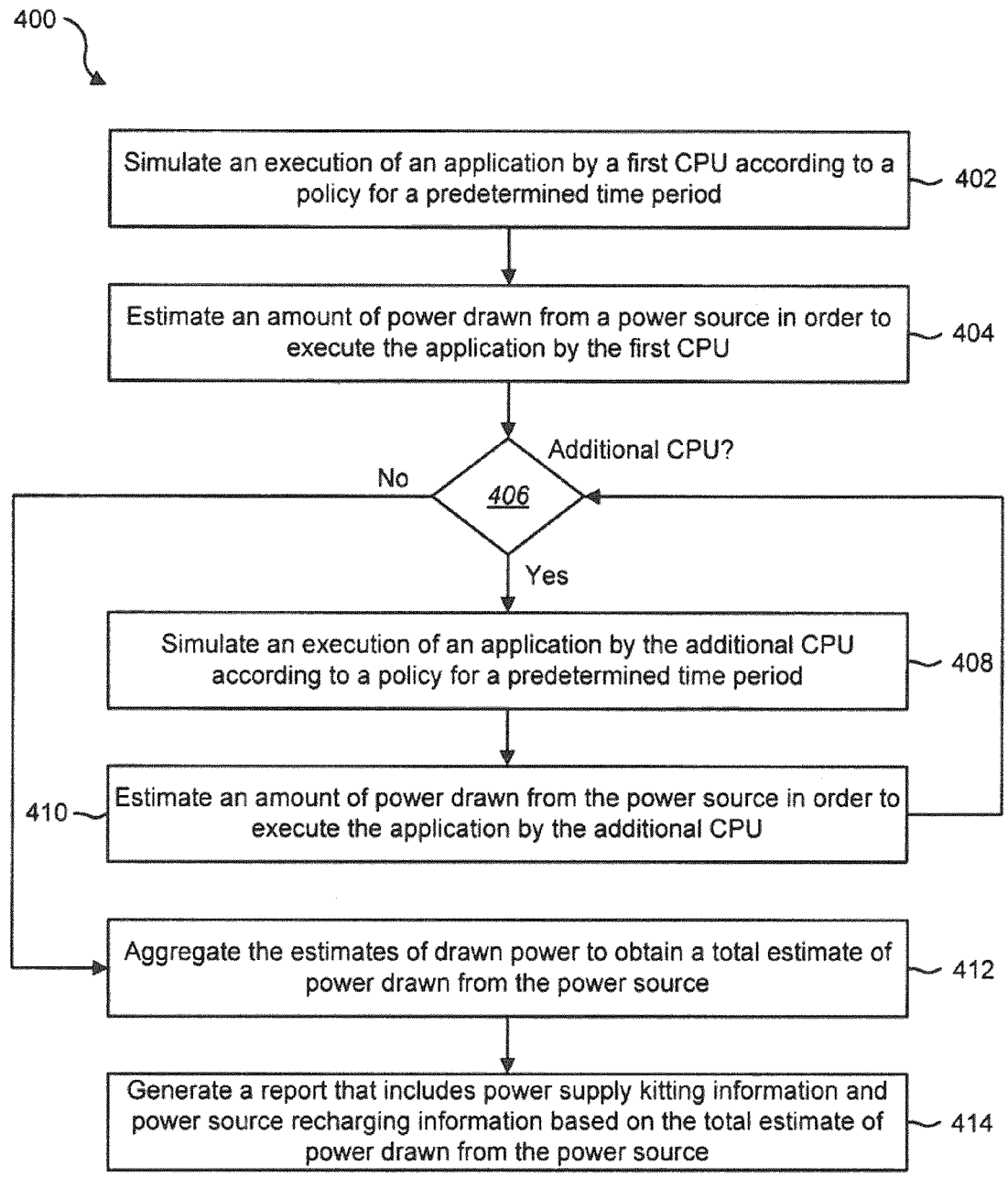
FIG. 4 is a flow diagram illustrating one embodiment of a method for determining the power cycle of a power source of a mobile device.

FIG. 4 is a flow diagram illustrating one embodiment of a method 400 for determining the lifetime of a power source of a mobile device. In one embodiment, the method 400 may be implemented by an emulator module 104, as previously described.

In one configuration, an execution of an application by a first CPU may be simulated 402. In one embodiment, the application may be executed according to a policy (or configuration) for a predetermined time period. An amount of power drawn from a power source in order to simulate the execute of the application by the first CPU may be estimated 404. In one embodiment, a determination 406 may be made as to whether an additional CPU exists. If it is determined 406 that an additional CPU does exist, an execution of an application by an additional CPU may be simulated 408. The application may be simulated according to a policy for a predetermined time period. An amount of power drawn from the power source in order to simulate the execution of the application by the additional CPU may be estimated 410.

In one embodiment, the method 400 may then return to determine 406 if an additional CPU exists. If an additional CPU does exist, the method 400 may repeat the process previously described. If, however, it is determined 406 that an additional CPU does not exist, the estimates of drawn power may be aggregated 412 to obtain a total estimate of power drawn from the power source. A report that includes power supply kitting information and power source recharging information may be generated 414 based on the total estimate of power drawn from the power source.

Figure 5:
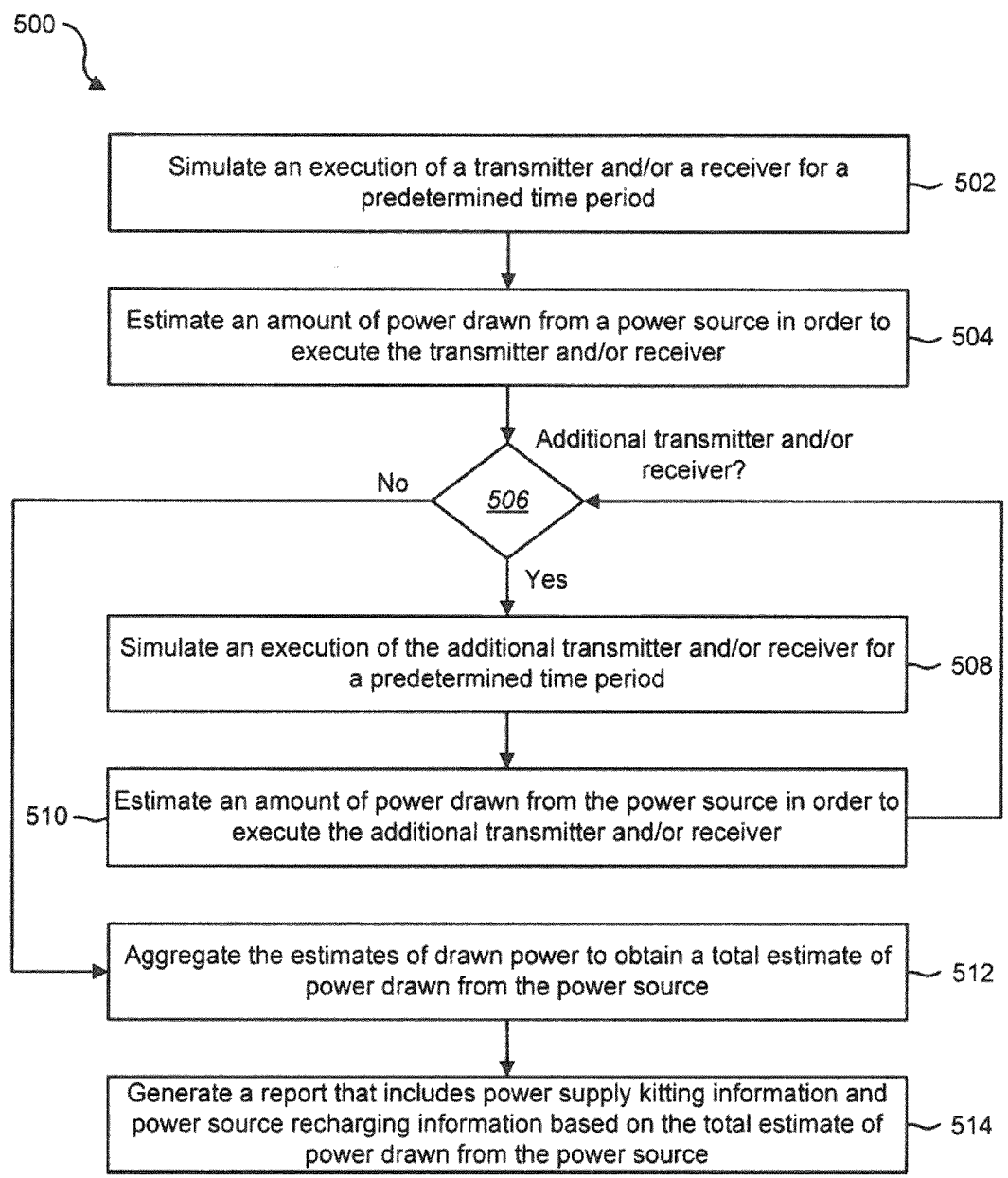
FIG. 5 is a flow diagram illustrating another embodiment of a method 500 for determining the lifetime of a power source of a mobile device.

FIG. 5 is a flow diagram illustrating another embodiment of a method 500 for determining the lifetime of a power source of a mobile device. In one embodiment, the method 500 may be implemented by an emulator module 104, as previously described.

In one configuration, an execution of a transmitter and/or a receiver may be simulated 502. In one embodiment, the transmitter and/or receiver may be executed for a predetermined time period. An amount of power drawn from a power source in order to simulate the execute of the transmitter and/or receiver may be estimated 504. In one embodiment, a determination 506 may be made as to whether an additional transmitter and/or a receiver exists. If it is determined 506 that an additional transmitter and/or receiver exists, an execution of the additional transmitter and/or receiver may be simulated 508. The additional transmitter and/or receiver may be simulated for a predetermined time period. An amount of power drawn from the power source in order to simulate the execution of the additional transmitter and/or receiver may be estimated 510.

In one embodiment, the method 500 may then return to determine 506 if an additional transmitter and/or receiver exists. If an additional transmitter and/or receiver does exist, the method 500 may repeat the process previously described. If, however, it is determined 506 that an additional transmitter and/or receiver does not exist, the estimates of drawn power may be aggregated 512 to obtain a total estimate of power drawn from the power source. A report that includes power supply kitting information and power source recharging information may be generated 514 based on the total estimate of power drawn from the power source.

Figure 6:
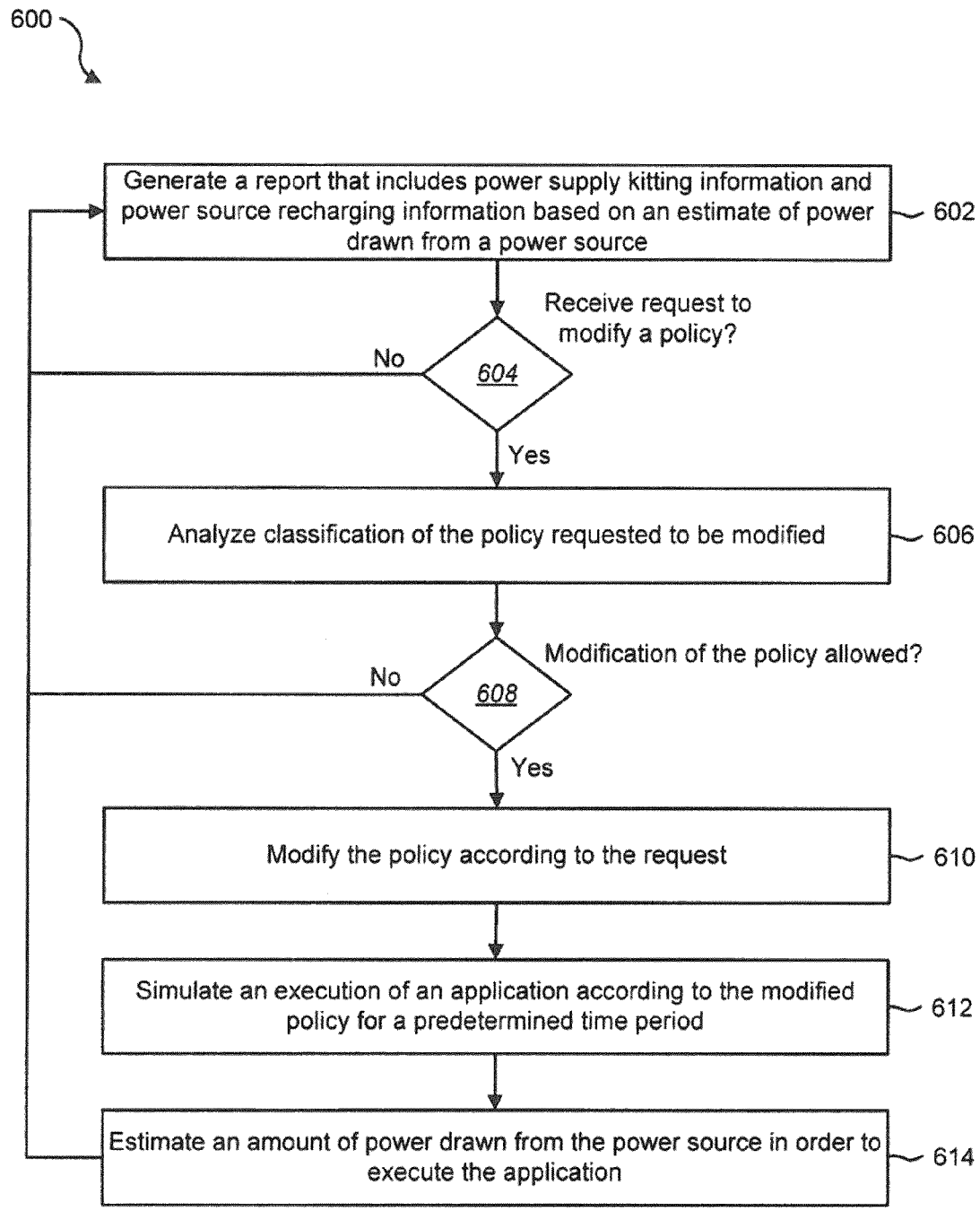
FIG. 6 is a flow diagram illustrating one embodiment of a method for modifying a policy associated with an application in order to determine the total power cycle of a power source of a mobile device.

FIG. 6 is a flow diagram illustrating one embodiment of a method 600 for modifying a policy of an application in order to determine a modified estimate of a total power cycle of a power source of a mobile device. In one embodiment, the method 600 may be implemented by an emulator module 104.

In one configuration, a report that includes power supply kitting information and power source recharging information may be generated 602 based on an estimate of power drawn from a power source. A determination 604 may be made as to whether a request to modify a policy of an application has been received. If it is determined 604 that a request to modify a policy has not been received, the method 600 may return to continue generating reports based on an estimate of power drawn from a power source 602. If, however, it is determined 604 that a request to modify a policy has been received, a classification of the application associated with the policy may be analyzed 606. In other words, the classification of the application may be determined. A determination 608 may be made as to whether modification of the policy is allowed based on the determined classification of the application. If it is determined 608 that modification of the policy is not allowed, the method 600 may return to continue generating 602 reports. For example, if it is determined that the application is a classified application running on a CPU designated to process sensitive information, modification of the policy of the application may not be allowed.

If, however, it is determined 608 that the policy is allowed to be modified, the policy may be modified 610 according to the request. An execution of the application according to the modified policy may be simulated 612 for a predetermined time period. An amount of power drawn from the power source in order to execute the application according to the modified policy may be estimated 614. The method 600 may then return to generate a report that indicates the power drawn from the power source based on the modified policy.

Figure 7:
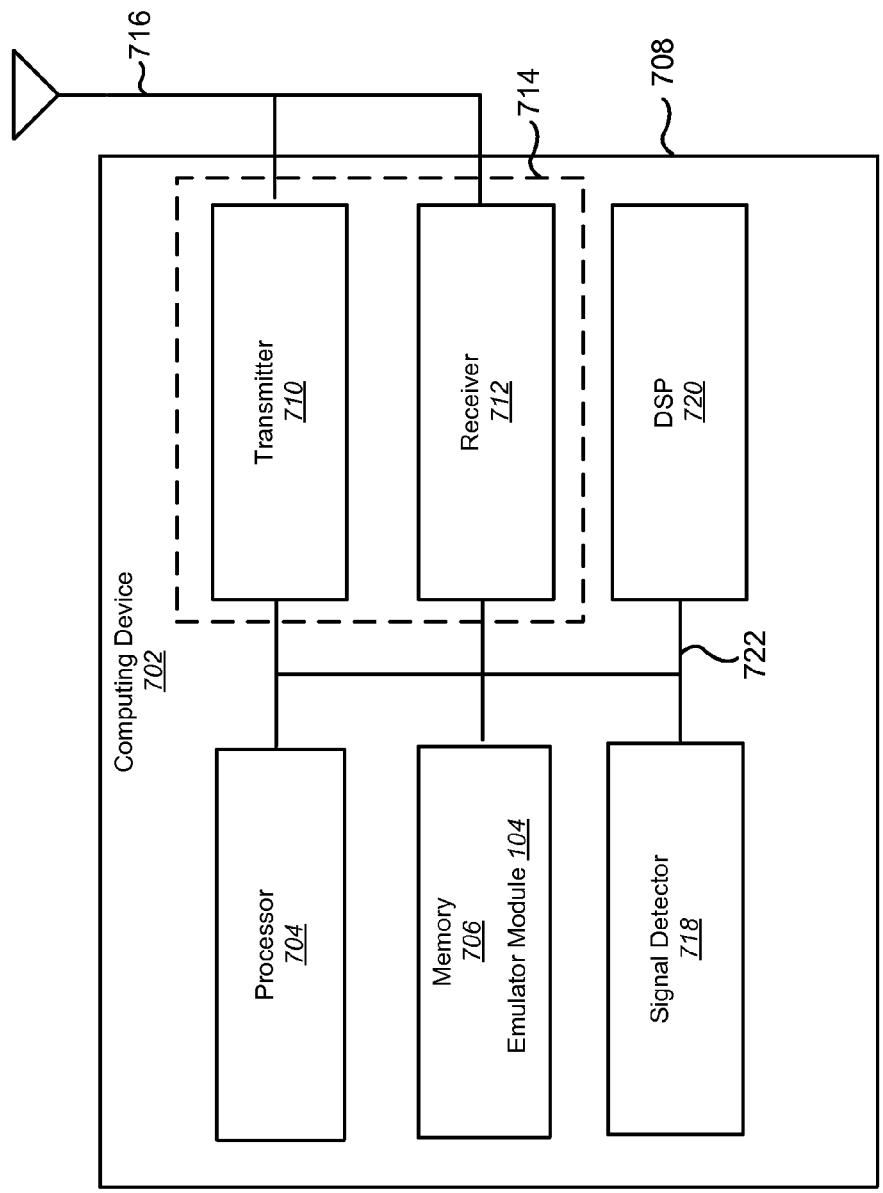
FIG. 7 depicts a block diagram of a computing device suitable for implementing the present systems and methods.

FIG. 7 illustrates various components that may be used in a computing device 702, such as a mobile device. The device 702 is an example of a device that may be configured to implement the various methods described herein.

The device 702 may include a processor 704 which controls operation of the computing device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein. For example, the memory 706 may include the emulator module 104 to implement the various methods described herein.

The device 702 may also include a housing 708 that may include a transmitter 710 and a receiver 712 to allow transmission and reception of data between the computing device 702 and a remote location. The transmitter 710 and receiver 712 may be combined into a transceiver 714. An antenna 716 may be attached to the housing 708 and electrically coupled to the transceiver 714. The device 702 may also include (not shown) multiple transmitters, multiple receivers, multiple transceivers and/or multiple antenna.

The computing device 702 may also include a signal detector 718 that may be used to detect and quantify the level of signals received by the transceiver 714. The signal detector 718 may detect such signals as total energy, pilot energy per pseudonoise (PN) chips, power spectral density, and other signals. The device 702 may also include a digital signal processor (DSP) 720 for use in processing signals.

The various components of the computing device 702 may be coupled together by a bus system 722 which may include a power bus, a control signal bus, and a status signal bus in addition to a data bus. However, for the sake of clarity, the various busses are illustrated in FIG. 7 as the bus system 722. The operating system provided on computing device 702 may be Windows Mobile®, Windows CE®, Android®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
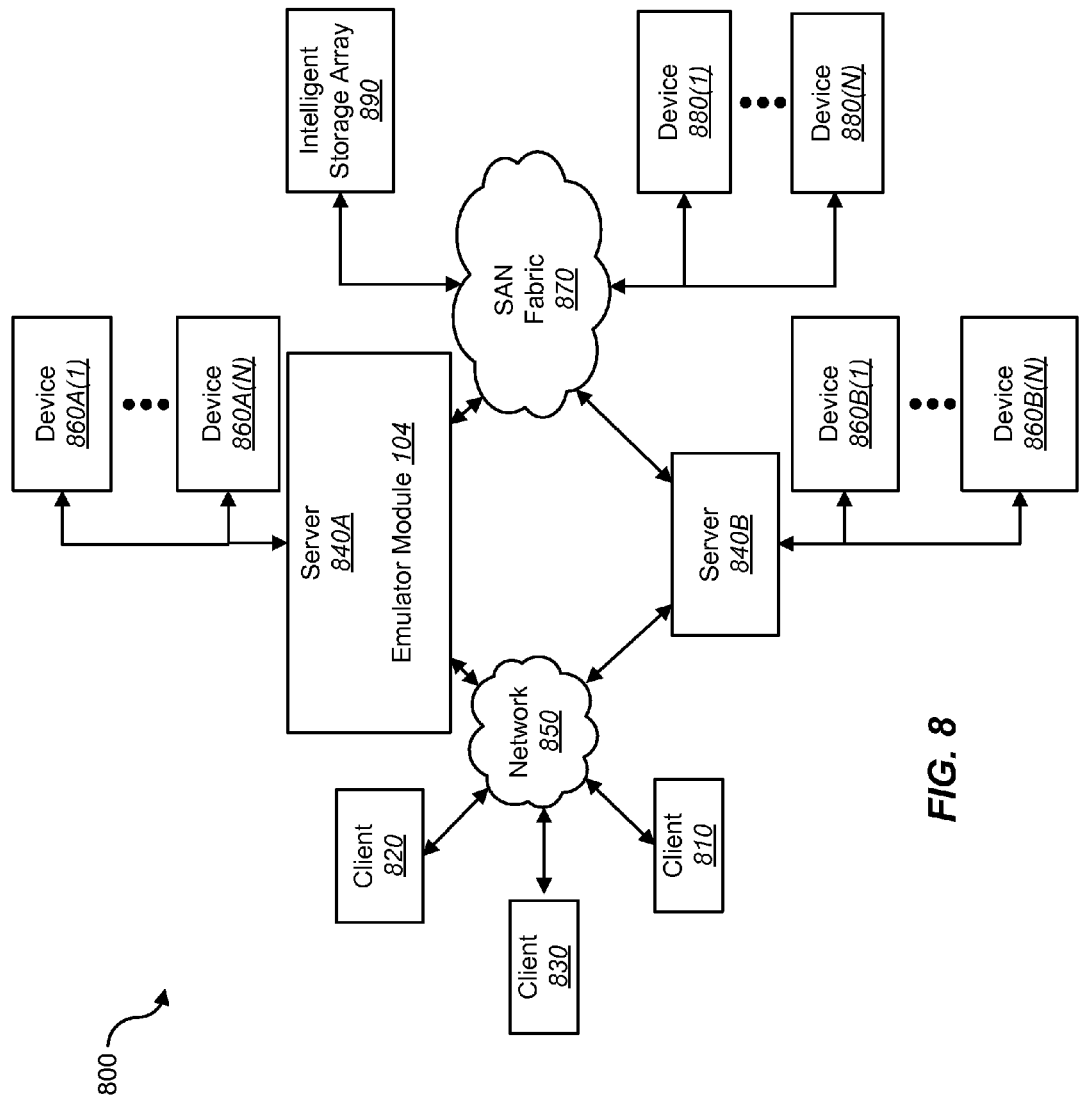
FIG. 8 is a block diagram depicting a network architecture in which client systems, as well as storage servers are coupled to a network.

FIG. 8 is a block diagram depicting a network architecture 800 in which client systems 810, 820 and 830, as well as storage servers 840A and 840B (any of which can be implemented using computing device 702), are coupled to a network 850. In one embodiment, the emulator module 104 may be located within a server 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining a power cycle of a power source of a mobile device, comprising:
    simulating an execution of one or more components of the mobile device;
    estimating an amount of power drawn by the one or more components from the power source during the simulated execution of each of the one or more components;
    aggregating the estimated amounts of power drawn from the power source by each of the one or more components to obtain a total estimate of power drawn from the power source;
    determining the power cycle of the power source according to the total estimate of power drawn from the power source by each of the one or more components; and
    generating a report comprising power source kitting information.

2. The method of claim 1, further comprising generating a report comprising power source recharging information.

3. The method of claim 1, wherein the one or more components comprise one or more applications executing on one or more central processing units (CPU), one or more transmitters, or one or more receivers.

4. The method of claim 3, wherein the one or more applications are anti-virus applications.

5. The method of claim 3, wherein the simulated execution of the one or more applications comprises a simulated scan for viruses on the one or more CPUs using one or more transmitters or receivers.

6. The method of claim 3, wherein the simulated execution of the one or more applications comprises a simulated poll for software updates to the one or more applications.

7. The method of claim 3, further comprising determining a classification of each of the one or more applications.

8. The method of claim 3, further comprising modifying a policy associated with an application in order to alter the simulated execution of the application, wherein the modified policy alters the simulated execution of the application to pull subsets of software updates based on a priority classification of the updates.

9. The method of claim 8, further comprising determining a modified power cycle of the power source according to the altered simulated execution of the application.

10. The method of claim 3, further comprising determining a rate capacity effect on the power source caused by each simulated execution of the one or more applications.

11. A computing device configured to determine a power cycle of a power source of a mobile device, comprising:
- a processor;
- memory in electronic communication with the processor, the memory storing executable instructions thereon, the instructions, when executed by the processor, cause the processor to:
    - simulate an execution of one or more applications by one or more components on the mobile device;
    - estimate an amount of power drawn by the one or more components from the power source during the simulated execution of each of the one or more components;
    - aggregate the estimated amounts of power drawn from the power source by each of the one or more components to obtain a total estimate of power drawn from the power source;
    - determine the power cycle of the power source according to the total estimate of power drawn from the power source by each of the one or more components; and
    - generate a report comprising power source kitting information.

12. The computing device of claim 11, wherein the report further comprises power source recharging information.

13. The computing device of claim 11, wherein the one or more components comprise one or more applications executing on one or more central processing units (CPU), one or more transmitters, or one or more receivers.

14. The computing device of claim 13, wherein the one or more applications are anti-virus applications.

15. The computing device of claim 13, wherein the simulated execution of the one or more applications comprises a simulated scan for viruses on the one or more CPUs using one or more transmitters or receivers.

16. The computing device of claim 13, wherein the simulated execution of the one or more applications comprises a simulated poll for software updates to the one or more applications.

17. The computing device of claim 13, wherein the processor is further configured to execute instructions to determine a classification of each of the one or more applications.

18. The computing device of claim 13, wherein the processor is further configured to execute instructions to modify a policy associated with an application in order to alter the simulated execution of the application, wherein the modified policy alters the simulated execution of the application to pull subsets of software updates based on a priority classification of the updates.

19. The computing device of claim 18, wherein the processor is further configured to execute instructions to determine a modified power cycle of the power source according to the altered simulated execution of the application.

20. A computer-program product for determining a power cycle of a power source of a mobile device, the computer-program product comprising a non-transitory computer-readable medium having instructions thereon, the instructions, when executed by a processor, cause the processor to:
- simulate an execution of one or more components on the mobile device;
- estimate an amount of power drawn by the one or more components from the power source during the simulated execution of each of the one or more components;
- aggregate the estimated amounts of power drawn from the power source by each of the one or more components to obtain a total estimate of power drawn from the power source; and
    - determine the power cycle of the power source according to the total estimate of power drawn from the power source by each of the one or more components; and
- generate a report comprising power source kitting information.

* * * * *